United States Patent [19]
Miller et al.

[11] Patent Number: 5,977,679
[45] Date of Patent: Nov. 2, 1999

[54] POLE-PHASE MODULATED TOROIDAL WINDING FOR AN INDUCTION MACHINE

[75] Inventors: John Michael Miller, Saline, Mich.; Vlado Ostovic, Weinheim, Germany

[73] Assignee: Ford Global Technologies, Inc., Dearborn, Mich.

[21] Appl. No.: 09/034,946

[22] Filed: Mar. 5, 1998

[51] Int. Cl.[6] .............................. H02K 3/00; H02K 1/16
[52] U.S. Cl. ........................ 310/164; 310/208; 310/254; 310/179; 310/216
[58] Field of Search ..................................... 310/164, 254, 310/179, 208, 216, 162, 166, 160, 159, 64, 45, 259

[56] References Cited

U.S. PATENT DOCUMENTS

| | | | |
|---|---|---|---|
| 228,544 | 6/1880 | Maxim | 310/254 |
| 2,424,443 | 7/1947 | Evans | 310/259 |
| 2,872,603 | 2/1959 | Herr | 310/111 |
| 3,774,062 | 11/1973 | Johnson | 310/184 |
| 4,087,711 | 5/1978 | Kirtley, Jr. et al. | 310/184 |
| 4,547,713 | 10/1985 | Langley et al. | 318/254 |
| 4,563,606 | 1/1986 | Fukiasawa et al. | 310/208 |
| 4,701,656 | 10/1987 | Fawzy | 310/254 |
| 5,079,467 | 1/1992 | Dorman | 310/156 |
| 5,334,899 | 8/1994 | Skybyk | 310/268 |

FOREIGN PATENT DOCUMENTS

| | | | |
|---|---|---|---|
| 1-138941 | 4/1989 | Japan | H02K 1/18 |
| 1-252143 | 10/1989 | Japan | H02K 17/08 |

*Primary Examiner*—Thomas M. Dougherty
*Assistant Examiner*—Burton S. Mullins
*Attorney, Agent, or Firm*—Roger L. May; Mark S. Sparschu

[57] ABSTRACT

A stator (10) for an induction machine for a vehicle has a cylindrical core (12) with inner and outer slots (26, 28) extending longitudinally along the inner and outer peripheries between the end faces (22, 24). Each outer slot is associated with several adjacent inner slots. A plurality of toroidal coils (14) are wound about the core and laid in the inner and outer slots. Each coil occupies a single inner slot and is laid in the associated outer slot thereby minimizing the distance the coil extends from the end faces and minimizing the length of the induction machine. The toroidal coils are configured for an arbitrary pole phase modulation wherein the coils are configured with variable numbers of phases and poles for providing maximum torque for cranking and switchable to a another phase and pole configuration for alternator operation. An adaptor ring (36) circumferentially positioned about the stator improves mechanical strength, and provides a coolant channel manifold (34) for removing heat produced in stator windings during operation.

18 Claims, 11 Drawing Sheets

$Q = 72$ SLOTS     $q = \dfrac{Q_s}{mp}$ $p =$

| q \ m | 2 | 4 | 6 | 8 | 10 | 12 |
|---|---|---|---|---|---|---|
| 2 | | | | | | |
| 3 | 12 | 6 | 4 | 3 | 2.4 | ②|
| 4 | | | | | | |
| 5 | | | | | | |
| 6 | 6 | 3 | 2 | 1.5 | 1.2 | 2 |
| 7 | | | | | | |
| 8 | | | | | | |
| 9 | | | | | | |
| 10 | 4 | ② | 1.33 | 1.0 | 0.8 | 0.67 |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | 2 | 1 | .67 | 0.5 | 0.4 | 0.33 |
| ⋮ | | | | | | |
| 36 | 1 | 0.5 | | | | |

ELECTRONIC POLE HOP

FIG. 5

POLE-PHASE MODULATED TOROIDAL WINDING FOR AN INDUCTION MACHINE

This invention was made with Government support under Prime Contract No. DE-AC36-83CH10093, Subcontract No. ZCB-4-13032-02, awarded by the Department of Energy. The Government has certain rights in this invention.

FIELD OF THE INVENTION

The present invention relates generally to induction machines, and, more particularly, to a toroidal wound induction machine for vehicle alternator/starter applications.

BACKGROUND OF THE INVENTION

In vehicle manufacture, space is budgeted for the transmission system and packaging. Induction machine stators with toroidal windings offer a space savings over stators with conventional lap windings. Lap windings require end space which increase the length of the machine. End space is needed to route a coil from one stator slot to another stator slot which is several slots away according to the pitch or spacing of the coils. The end turn, the length of coil that extends from between the slots from one coil side to the other coil side, extends beyond the stator laminations thereby increasing the length of the stator by the distance required for the coil to make the turn from the slot for one side of the coil to the corresponding slot for the other side of the coil. Toroidal windings conserve space because a large turning area for end turns is not required. Toroidal coils are wound about the core with one side of the coil laid in the slot on the interior of the laminations, and the other side of the coil being laid on the outer periphery of the laminations. However, even with toroidal windings, there are end turns that extend beyond the laminations because of the space required for the coil to make the turn to go from one side of the laminations to the other side of the laminations.

In a vehicle, the alternator is subjected to constant operation generating heat which must be dissipated. Conventional toroidal windings have coils surrounding the core compounding the problem of heat dissipation because the core can not be used to dissipate coil heat as is the case with lap windings. Hot spots can exist where the coil is not in uniform contact with the core laminations. Further, toroidal coils are layered placing one layer closer to a heat sink so that heat is not transferred uniformly. Another problem with some toroidal windings is that the inner diameter of the core is smaller than the outer diameter so that spacers must be hand positioned when assembling the coils to prevent coil movement. Adding spacers during assembly complicates the assembly process and slows production.

It is desirable to have a stator with toroidal coils that have minimal end turn and promote heat dissipation.

SUMMARY OF THE INVENTION

The present invention is directed to overcoming one or more of the problems set forth above. Briefly summarized, according to one aspect of the present invention, a stator for an induction machine comprises a cylindrical core that has a plurality of inner and outer slots and a plurality of toroidal coils wound about the core and laid in the inner and outer slots. Each toroidal coil occupies a single inner slot and is laid in the adjacent associated outer slot to minimize the distance the coils extend from the end faces of the core thereby minimizing the length of the induction machine. The coils are encapsulated in a material which fills any voids to provide a thermal path for uniform heat dissipation.

The area of the outer slots is equal to the area of the inner slots. When the inner slots are full, the coils fit exactly in the outer slots. An exact fit increases mechanical integrity of the structure, and a single layer winding minimizes end turn build up while providing a thermal path.

The present invention enables arbitrary combination of the number of poles and phases. Its principle of operation will be illustrated on an example of a 4-pole, 9-phase alternator and a 12-pole, 3-phase motor.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 5 is chart illustrating the number of slots/pole/phase for slot combinations for the pole-phase modulated starter-alternator induction machine of FIG. 1.

DETAILED DESCRIPTION OF THE PREFERRED EMBODIMENTS

Figure 1:
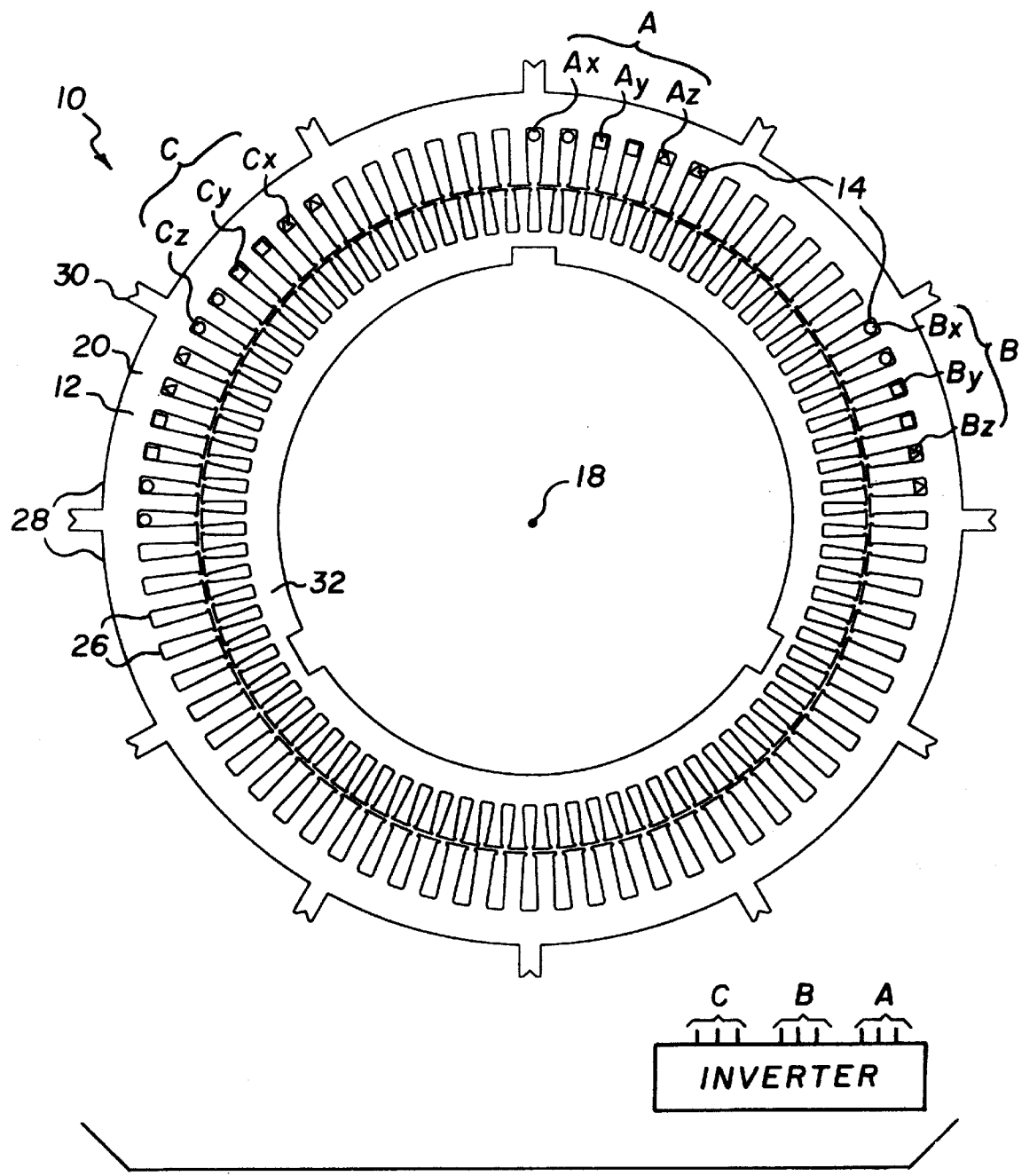
FIG. 1 is a wiring diagram illustrating windings on an example of a stator core of an induction machine for a vehicle connected to an inverter according to the present invention.
Figure 2:
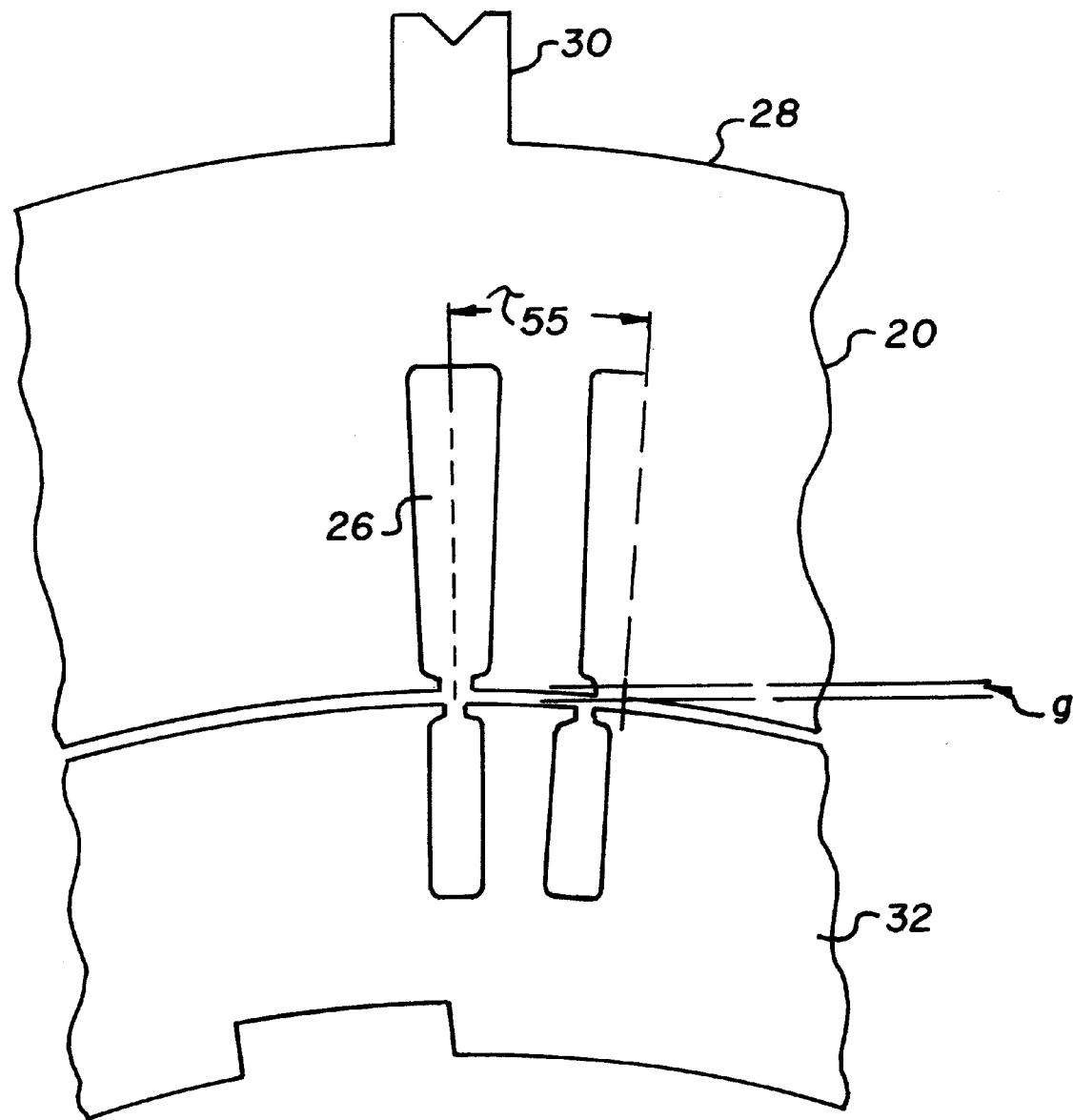
FIG. 2 is a somewhat enlarged view of a section of the stator lamination and its relationship to the rotor.
Figure 3:
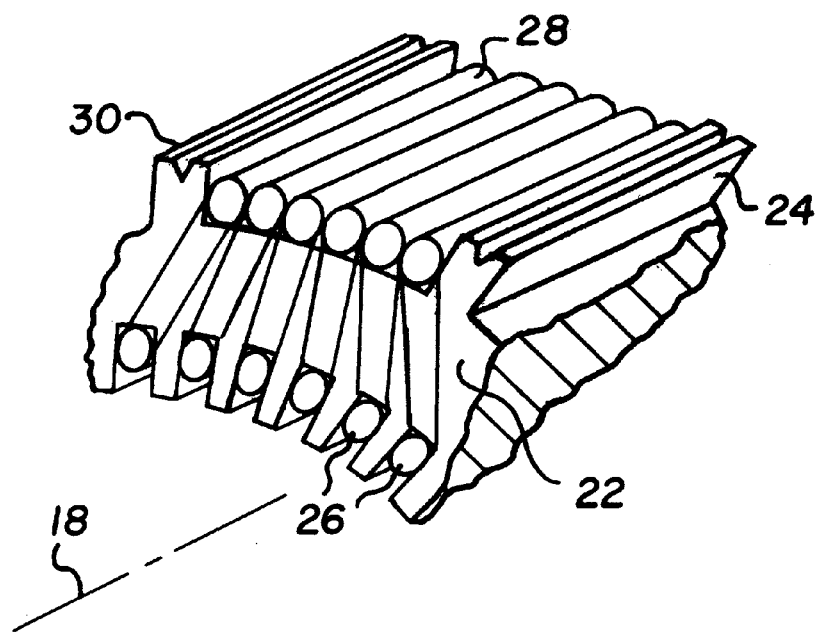
FIG. 3 is a perspective view of a section of the stator core showing a coil laid in the inner and outer slots.
Figure 4:
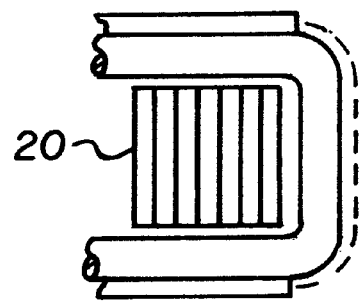
FIG. 4 is diagrammatic end view of the stator core and coil showing the end turn.

Referring to FIGS. 1–4, a stator 10 for an induction machine, for use in an alternator or starter of vehicle for example, contains a stator core 12 with a plurality of coils 14. The coils 14 are connected to an inverter 16 for multiphase operation.

The core 12 has a hollow cylindrical shape with a longitudinal axis 18 and is formed of a plurality of steel laminations 20. Core 12 has first and second end faces 22, 24 each oriented perpendicular to the longitudinal axis 18, an inner periphery and an outer periphery. The inner periphery defines a plurality of inner slots 26 equally spaced about the inner periphery that are open on the hollow interior of the core for receiving the coils. The outer periphery defines a plurality of outer slots 28 that are equally spaced about the outer periphery, and defines a plurality of tabs 30 that are also equally spaced about the outer periphery. The tabs and outer slots are equal in number with each outer slot existing between consecutive tabs and with each tab existing between consecutive outer slots.

Tabs 30 protrude radially outward from the lamination. When assembled, tabs 30 extend the length of the core with the sides of each tab parallel to one another so that the bottom of an outer slot is slightly narrower than its top because of the curvature of the core. The number of inner slots 26 is a multiple of the number of outer slots 28.

Referring to FIG. 5, slot combinations for the pole-phase modulated starter-alternator (S/A) of the present invention are selected to give smooth torque operation in the alternator mode (4-pole, 9-phase). For the preferred design the following relationships hold:

$Q_s$=72=number of outer stator slots;
$Q_r$=87=number of rotor slots;
P=12/4=number of poles; and
m=9/3=number of phases.

For example, in a conventional 4-pole, 10 hp induction machine, the slot combinations are generally $$\frac{Q_s}{Q_r} = \frac{36}{44}$$

to minimize slot ripple torque. In a pole hopping design such as the present pole-phase modulated starter-alternator, the goal is q=2 slots/pole/phase according to the table of FIG. 2 giving $$q = \frac{Q_s}{mP}.$$

For the starter-alternator to achieve a 3:1 pole change during the transition from engine cranking to alternator mode, it is desirable that an integral number of coils exist per pole. For a given selection in the number of coils/pole/phase and for the design to accommodate a 12-pole to 4-pole transition, a shift in the phase number is required. As can be seen from the table of FIG. 5, in the cranking mode with a 12-pole flux pattern and 3-phase excitation to an S/A wound with 2 coils/pole/phase, every 6 coils define a magnetic pole. The rotor with $Q_r$=87 slots can be considered to have $$mq = \frac{Q_r}{P} = \frac{87}{12} = 7.25$$

during cranking mode and $$mq = \frac{87}{4} = 21.75$$

during alternator mode. For the cage rotor it is not appropriate to think of phases or coils/pole/phase, rather to consider the cage rotor as an approximation to a continuous conductor sheet.

Winding the stator with 2 coils/pole/phase as a 4 pole winding having 9 phases permits the electronic grouping of coils into a 3-phase system with 12 poles. Other pole number combinations are allowed, but at the expense of a higher number of phases, hence electronic complexity. For example, to realize a P=12-pole-8 pole-4-pole electronic changeover will require m=18 phases with q=1 slot/pole/phase.

As illustrated in FIG. 1, there are 12 outer slots 28 and 72 inner slots 26 configured about the rotor 32. Rotor 32 is configured with 87 slots on its outer periphery. A gap, g, on the order of 0.6 mm exists between the stator and rotor.

There is a desired relationship between gap g and the pitch of the stator given by $$\frac{g}{\tau_{ss}} < 0.01.$$

The total cross-sectional area of the inner slots is equal to the total cross-sectional area of the outer slots so that coils from six inner slots fill one outer slot. When the inner slots are full of windings, there is exactly enough space for the windings in the outer slots to be placed in a single layer.

Single layer construction allows the coil to abut the core end faces or be laid very closely to the end faces with only a small amount of space to allow for the turning radius of the coil. Because the area of six inner slots equals the area of one outer slot, the coils may be stacked in two layers in the inner slots and still be stacked in only one layer in the outer slot providing a compact construction. The compact construction is possible even with two coils in the inner slots because transposition from the bottom slot to the top slot requires minimum crossover and clearance. The crossover occurs between adjacent positions in an outer slot and a single inner slot. Only the coils involved in the transposition add to end turn build up which is minimal. This is in sharp contrast to conventional lap windings where end build up at any point involves more than adjacent coils and routinely involves a number of coils equal to the coil pitch.

The coil is preferably encapsulated in an epoxy resin material. Preferably, a pottery compound of silicon coated aluminum nitride in an epoxy resin binder is used, such as SCAN manufactured by the Dow Chemical Company, 2030 Dow Center, Midland, Mich. 48674. When applied in a liquid form, the epoxy resin fills any voids existing between the coils and the core laminations forming a unitary structure. Because a unitary structure is formed, the heat transfer will be even. The lack of voids prevents the formation of hot spots so that heat dissipation and transference is uniform. The epoxy resin also bonds the coil to the core for structural integrity and mechanical strength. Because a unitary structure is formed with epoxy encapsulation, heat can be radiated outward from the core, removed from the outer periphery of the core assisted by a fan, and/or dissipated through the housing in which the stator is mounted through direct contact with the plurality of tabs which are also used for mounting the stator in the machine housing.

Figure 12:
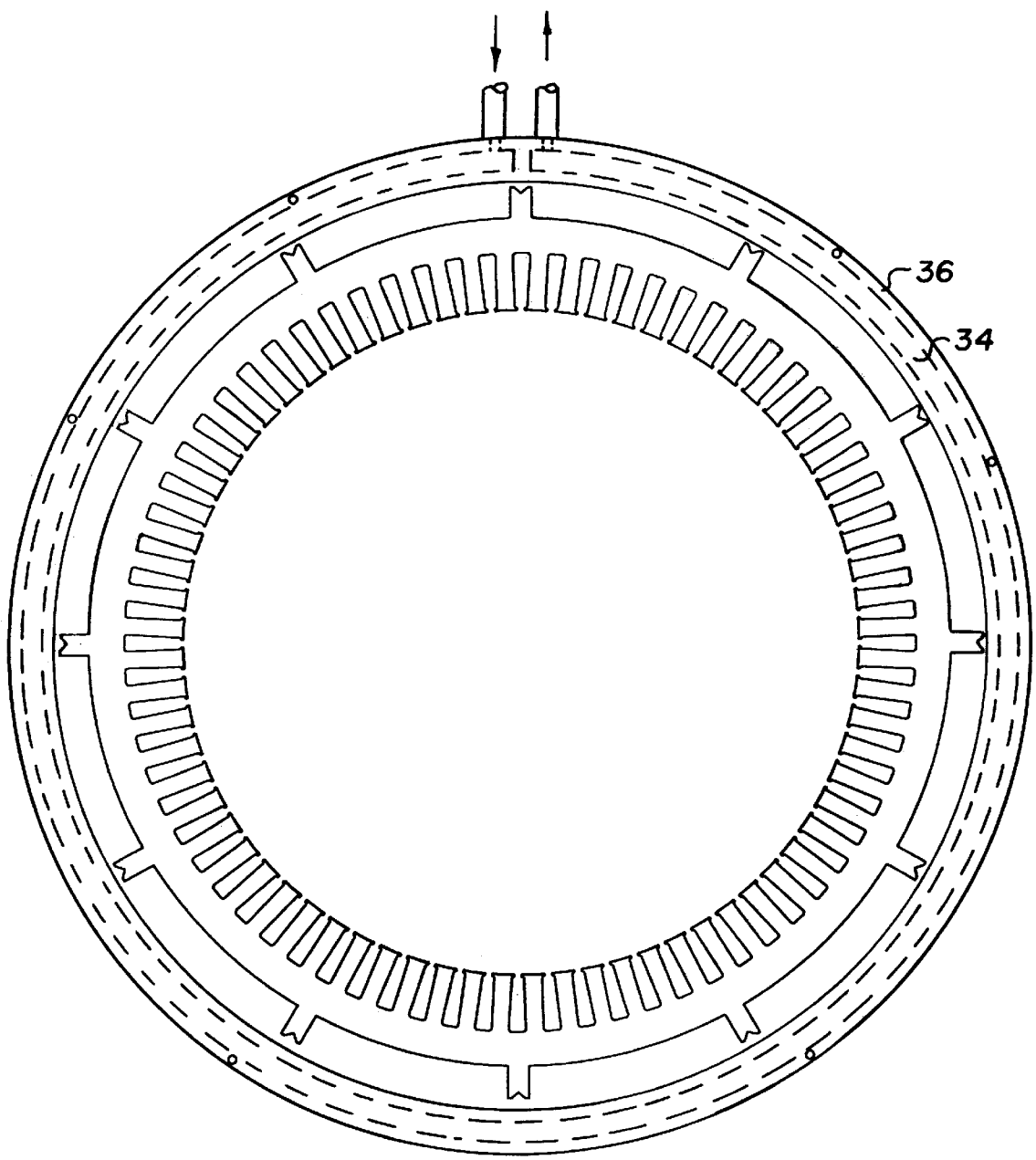
FIG. 12 is a cross-sectional diagram of an induction machine illustrating the stator and coolant manifold.

Referring to FIG. 12, cooling is preferably accomplished by circulating coolant through a coolant channel 34 formed in the adapter ring 36. Heat is transferred from the core and coils to the adapter ring where it is removed by the circulating coolant. The encapsulant aids the heat transfer from the core and coils to the adapter ring 36. When the induction machine is used in a vehicle, the coolant can circulate through the vehicle heat exchanger or may have its own heat exchanger.

Figure 6:
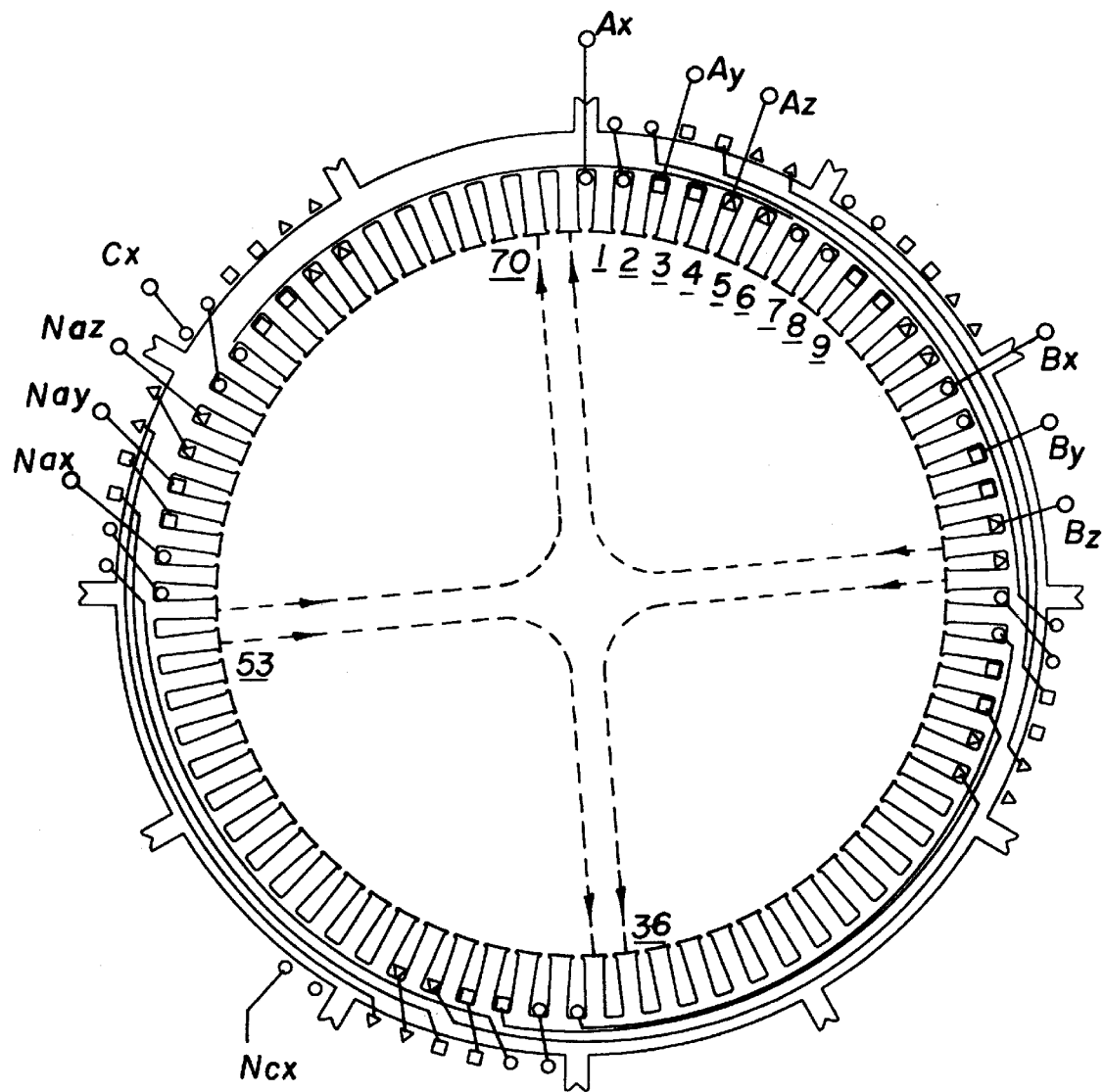
FIG. 6 is diagram illustrating magnetic pole formation for 4-pole operation.
Figure 7:
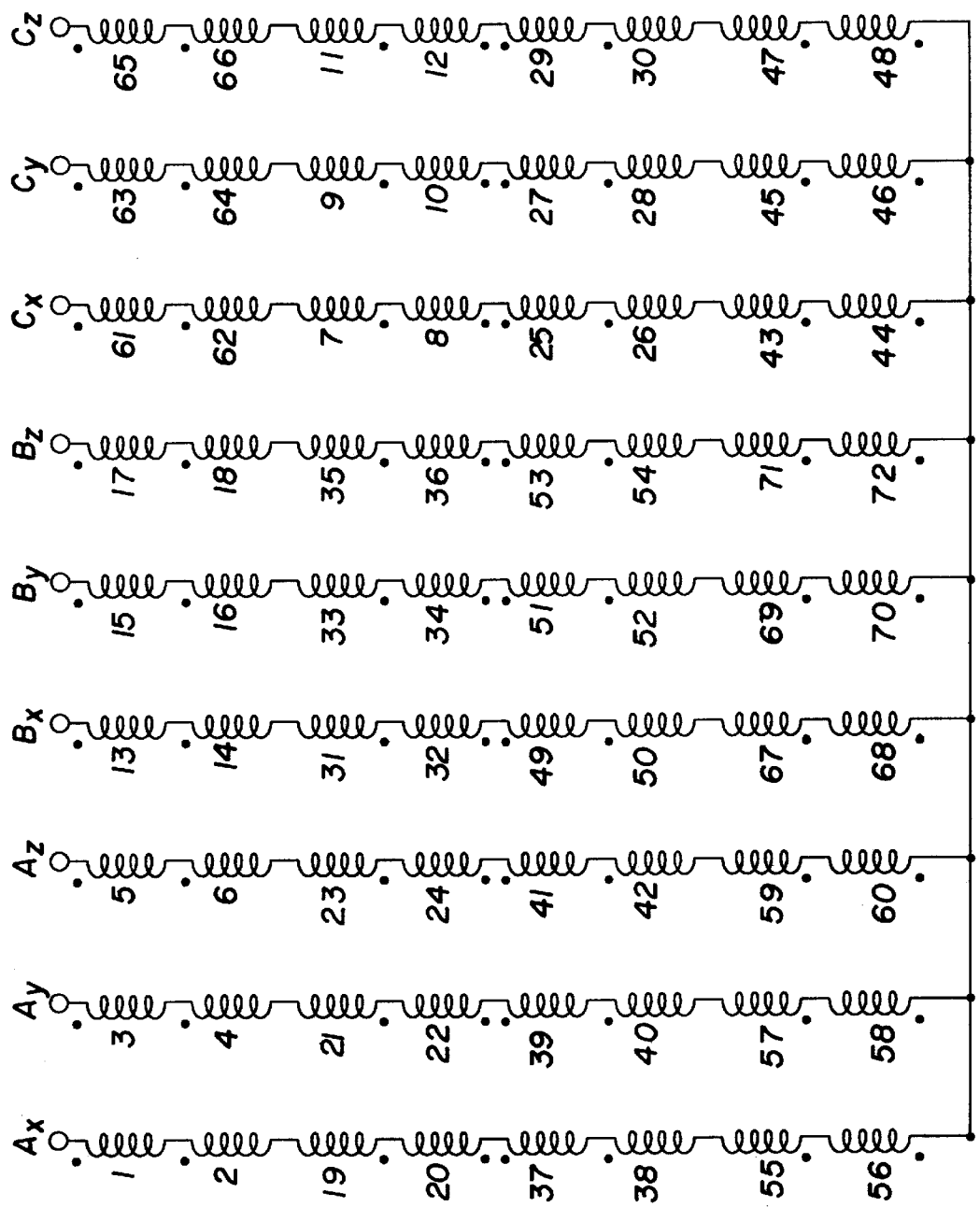
FIG. 7 is schematic diagram illustrating coil connections for 4-pole 9-phase and 12-pole 3-phase operation.

Referring to FIGS. 6 and 7, coil connections are illustrated for 4-pole magnetic flux pattern. For reference, the inner slots are numbered clockwise from 1 to 72. Four magnetic poles are formed that are spaced 90° apart. For the 4-pole 9-phase configuration, q=2 slots/pole/phase so that the coil for phase $A_x$ occupies two inner slots, namely slots 1 and 2, while phase $A_y$ occupies slots 3 and 4 and $A_z$ occupies slots 5 and 6. The coils are connected in series with the coil for phase $A_x$ in one pole connected to the coil for phase $-A_x$ in another pole so that current flow is in opposite directions to create opposite poles. Thus, for 4-pole operation, the coil in slots 1–2 generate one pole while the coils in slots 19–20 generate an adjacent pole of opposite polarity.

Phases $A_x$, $A_y$, $A_z$ respectively start at slots 1, 3 and 5, continue at slots 19, 21 and 23, slots 37, 39 and 41, and end at slots 55, 57 and 59 with neutrals connected at slots 56, 58 and 60. Phases $B_x$, $B_y$, $B_z$ respectively start at slots 13, 15 and 17 while phases $C_x$, $C_y$, $C_z$ respectively start at slots 61, 63 and 65. Beginning with the outer slot opposite inner slots 1–6 and proceeding clockwise are the phases for group A, then –C, B, the –A, c –B, etc.

Figure 8:
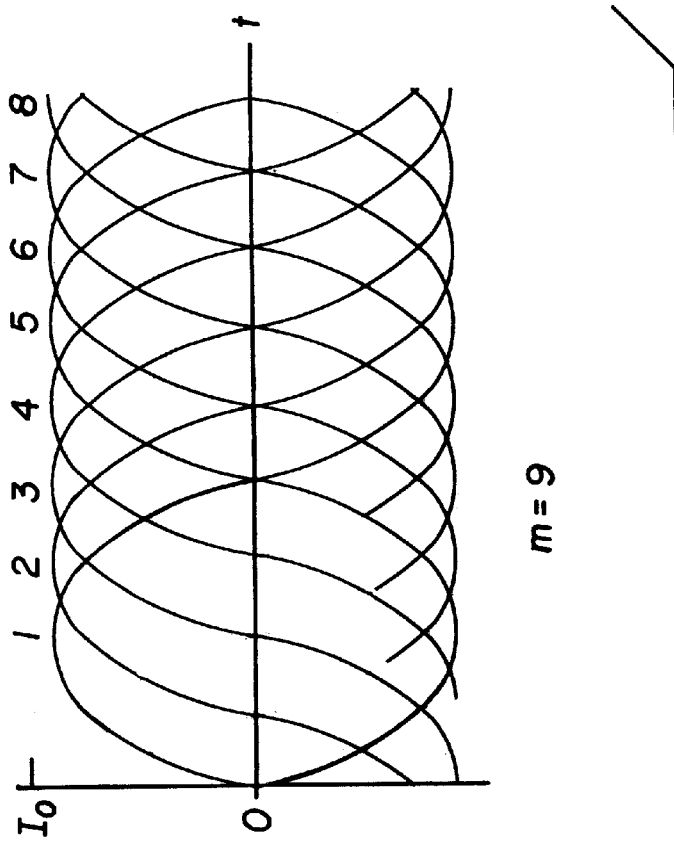
FIG. 8 is a graph of temporal relationships for 12-pole 3-phase operation.
Figure 9:
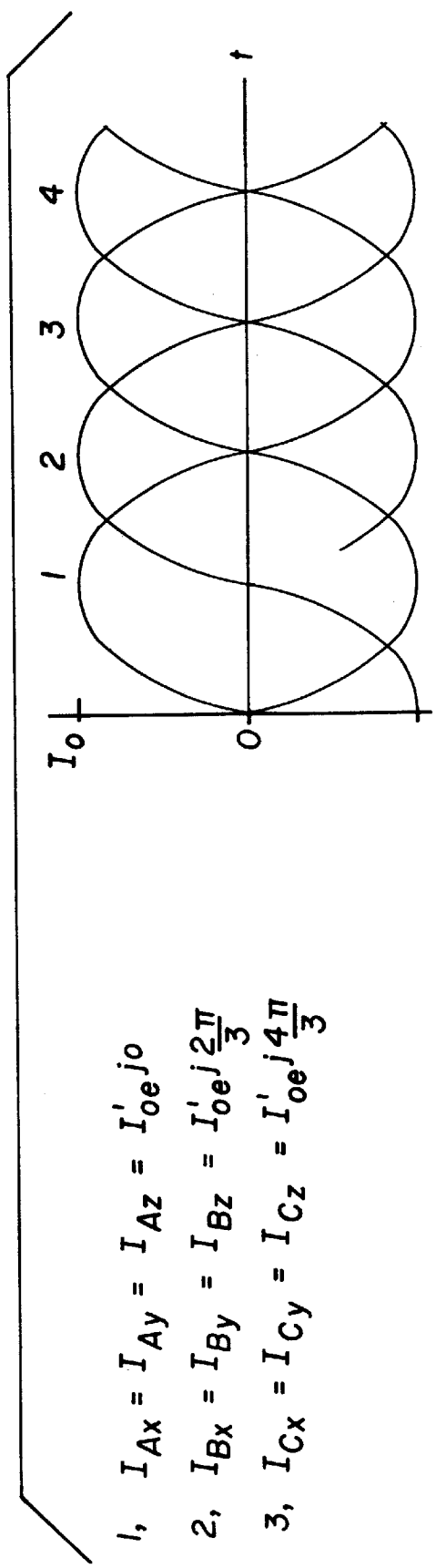
FIG. 9 is a graph of temporal relationships for 4-pole 9-phase operation.
Figure 10:
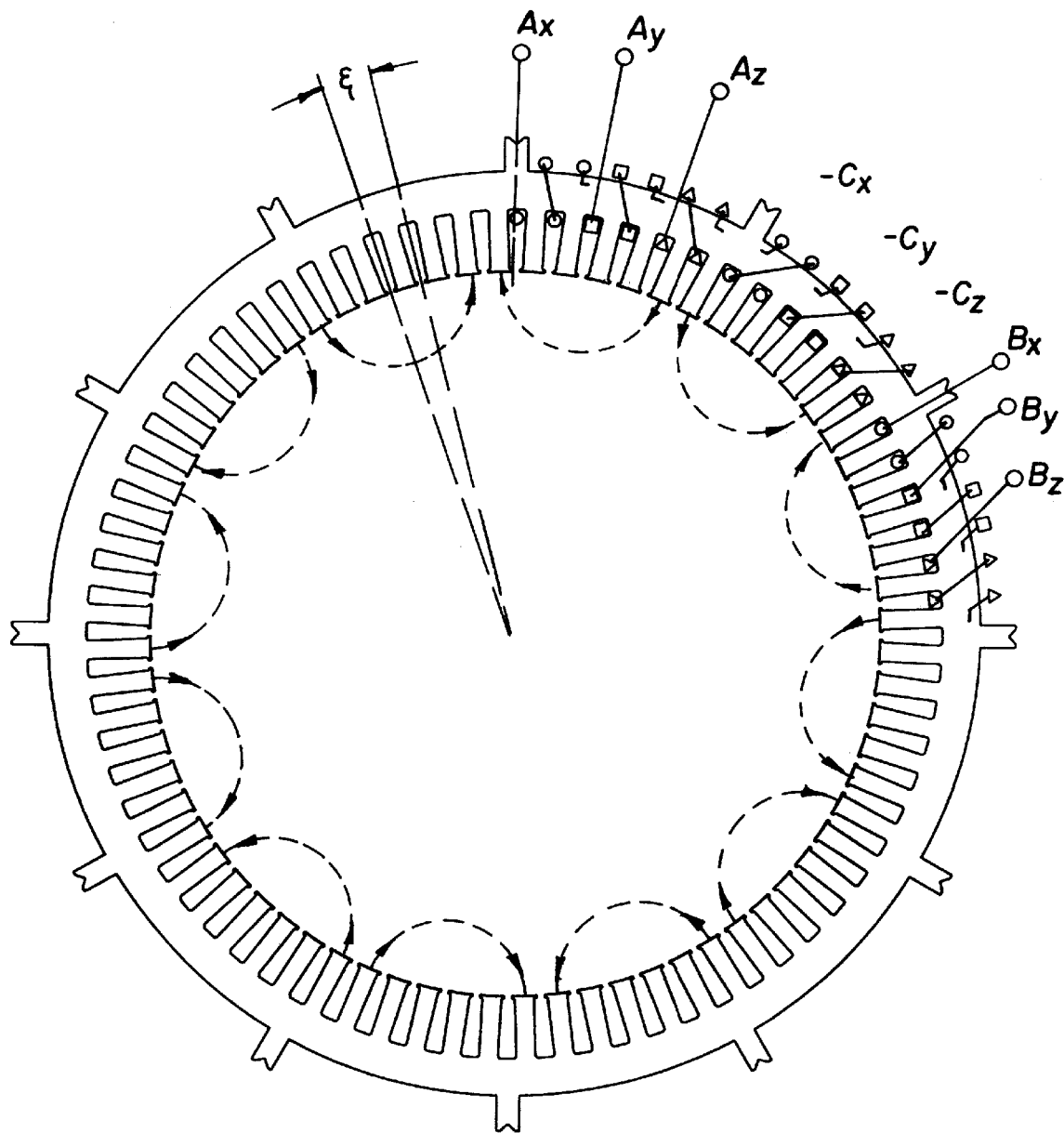
FIG. 10 is a graph similar to FIG. 8 but for 12-pole 3-phase currents.
Figure 11:
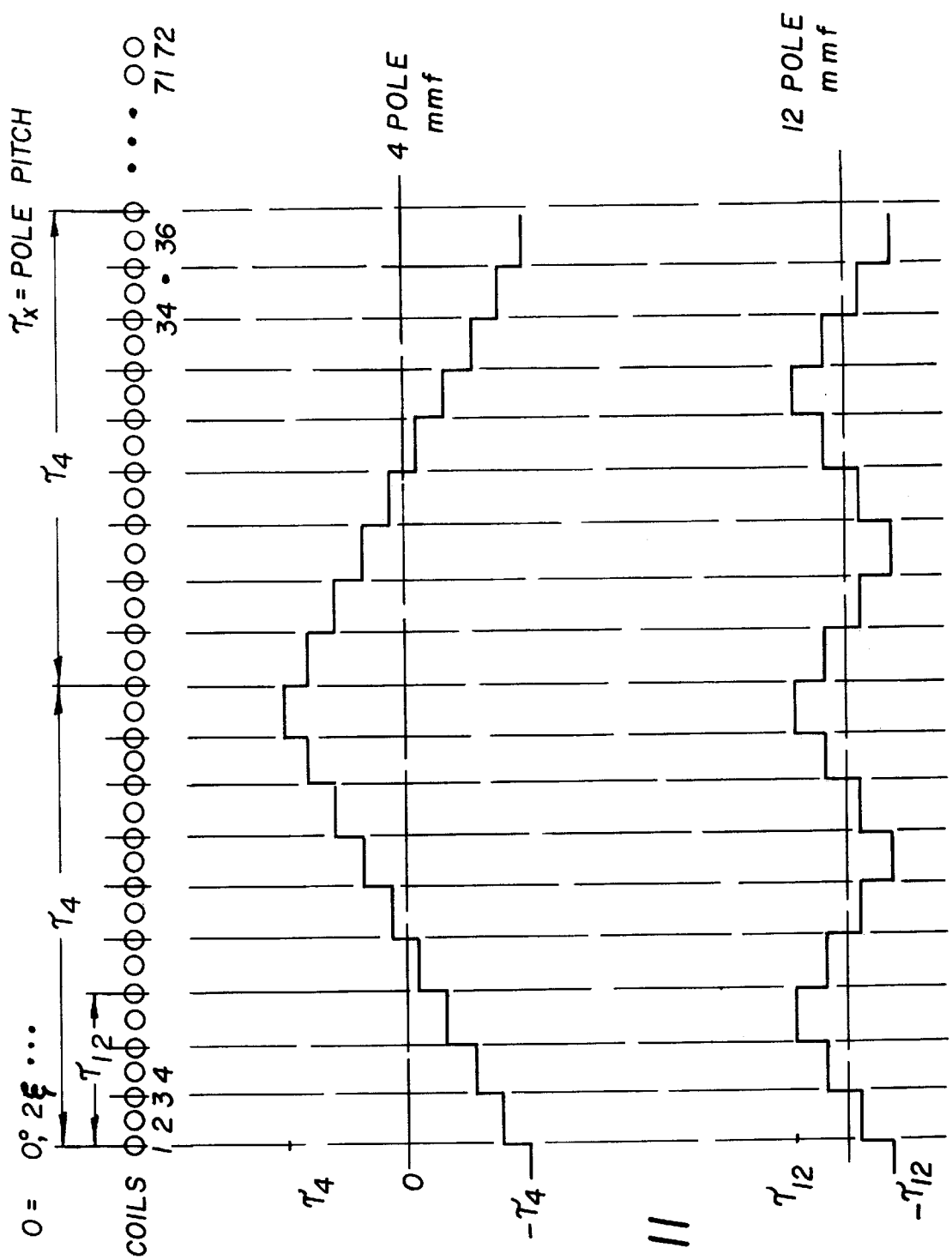
FIG. 11 is a graph of machine winding functions for 4-pole and 12-pole systems.

FIG. 8 illustrates the temporal relationships for currents for 4-pole 9-phase operation. FIG. 9 illustrates the temporal relationships for currents for 12-pole 3-phase operation. The angle between adjacent slots is defined by the relationship:

$$\xi = \frac{2\pi}{Q_s} = \frac{2\pi}{72} = \frac{\pi}{36} \text{rad/slot}$$

$$2\xi = \frac{\pi}{18} \text{rad/coil pair}$$

as shown in FIG. 10, which illustrates the poles for 12-pole 3-phase operation where phases are X, Y and Z. FIG. 11 illustrates machine winding functions where for 4-pole mmf and 12-pole mmf $\tau_x$ is the pole pitch.

Unlike the lap winding where each coil would occupy two different slots spaced apart typically by the pole pitch forming connecting end turns, the toroidal coil occupies a single slot. Because there are no bulky end turns spanning several slots, the axial length is shorter than for an equivalent lap winding. The inverter can switch from a 9-phase system useful for cranking to a 3-phase system for alternator duty. Switching from 9-phase to 3phase changes the pole configuration from 4pole to 12pole.

It will be now appreciated that there has been presented a stator for an induction machine. The stator core is formed of steel laminations with both inner slots and outer slots. Tabs separate the outer slots and help confine the coils to the slots. The total area of the outer slots equals the total area of the inner slots so that all slots can be completely filled which promotes mechanical integrity of the structure. Encapsulating the coils in a pottery compound with an epoxy resin binder creates a thermal bond to the adapter ring and other structure for cooling the stator assembly. The adapter ring is designed as a cylindrical coolant manifold. It provides a coolant channel around the stator and maintains the air gap concentric and uniform. A coil is laid in each inner slot forming a single layer winding. Because the toroidal coil lies completely in one slot, instead of two slots separated by the pole pitch, there is no end turn buildup thereby minimizing end turn space requirements. The induction machine can be switched between arbitrary polarity and number of phases.

While the invention has been described with particular reference to a preferred embodiment, it will be understood by those skilled in the art that various changes may be made and equivalents may be substituted for elements of the preferred embodiment without departing from invention. As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A stator for an induction machine, comprising:
    a cylindrical core having a longitudinal axis, inner and outer peripheries, first and second end faces, a plurality of inner slots extending longitudinally along said inner periphery between said first and second end faces, and a plurality of outer slots extending longitudinally along said outer periphery between said first and second end faces, each of said outer slots being associated with several adjacent inner slots; and
    a plurality of toroidal coils wound about said core and laid in said inner and outer slots, each of said toroidal coils occupying a single inner slot and being laid in said associated outer slot to thereby minimize distance said coil extends from said end faces, said coils being encapsulated in a pottery compound containing silicon coated aluminum nitride in an epoxy resin binder with said compound filling any voids existing between said coils and said end faces and said core for even heat dissipation.

2. A stator, as set forth in claim 1, wherein said stator has a number of magnetic poles.

3. A stator, as set forth in claim 2, wherein the number of inner slots is a multiple of said number of magnetic poles.

4. A stator, as set forth in claim 1, wherein the total cross-sectional area of said outer slots generally equals the total cross-sectional area of said inner slots.

5. A stator, as set forth in claim 1, wherein said coils are configured for operation with an arbitrary number of phases.

6. A stator, as set forth in claim 1, wherein said coils are configured to form an arbitrary number of magnetic poles.

7. A stator, as set forth in claim 1, including an adapter ring circumferentially positioned about said stator to thereby increase mechanical integrity of said stator.

8. A stator, as set forth in claim 1, including an adapter ring circumferentially positioned about said stator and having a coolant channel for receiving and circulating a fluid to remove heat from said core and coils.

9. A stator for an induction machine for a vehicle, said vehicle having an engine and an electrical system, said stator comprising:
    a cylindrical core having a longitudinal axis, inner and outer peripheries, first and second end faces, a plurality of inner slots extending longitudinally along said inner periphery between said first and second end faces, and a plurality of outer slots extending longitudinally along said outer periphery between said first and second end faces, each of said outer slots being associated with several adjacent inner slots; and
    a plurality of toroidal coils wound about said core and laid in said inner and outer slots, each of said toroidal coils occupying a single inner slot and being laid in said associated outer slot to minimize distance said coils extend from said end faces and thereby minimize length of said induction machine, said toroidal coils being configured for an arbitrary pole phase modulation wherein said coils are configured with a first arbitrary number of phases and poles for cranking said engine and a second arbitrary number of phases and poles for alternator duty for charging said electrical system, said first arbitrary number of phases being greater than said second arbitrary number of phases to produce starting torque, and said second arbitrary number of poles being greater than said first arbitrary number of poles to produce smooth operation.

10. A stator, as set forth in claim 9, wherein said coils are encapsulated in an epoxy resin with said epoxy resin filling any voids existing between said coils and said end faces and said core for even heat dissipation.

11. A stator, as set forth in claim 9, wherein said coils are encapsulated in a pottery compound containing silicon coated aluminum nitride in an epoxy resin binder with said compound filling any voids existing between said coils and said end faces and said core for even heat dissipation.

12. A stator, as set forth in claim 9, wherein the total area of said outer slots generally equals the total area of said inner slots.

13. A stator, as set forth in claim 9, including an adapter ring circumferentially positioned about said stator to thereby increase mechanical integrity of said stator.

14. A stator, as set forth in claim 9, including an adapter ring circumferentially positioned about said stator and having a coolant channel for receiving and circulating a fluid to remove heat from said core and coils.

15. A stator for an induction machine, comprising:

a cylindrical core having a longitudinal axis, inner and outer peripheries, first and second end faces, a plurality of inner slots extending longitudinally along said inner periphery between said first and second end faces, and a plurality of outer slots extending longitudinally along said outer periphery between said first and second end faces, each of said outer slots being associated with several adjacent inner slots, the total cross-sectional area of said outer slots generally equaling the total cross-sectional area of said inner slots;

a plurality of toroidal coils wound about said core and laid in said inner and outer slots, each of said toroidal coils occupying a single inner slot and being laid in said associated outer slot to thereby minimize distance said coil extends from said end faces; and an adapter ring circumferentially positioned about said stator and having a coolant channel for receiving and circulating a fluid to dissipate heat from said core and coils.

16. A stator, as set forth in claim 15, wherein said coils are encapsulated in an epoxy resin with said epoxy resin filling any voids existing between said coils and said end faces and said core for even heat dissipation.

17. A stator, as set forth in claim 15, wherein said coils are encapsulated in a pottery compound containing silicon coated aluminum nitride in an epoxy resin binder with said compound filling any voids existing between said coils and said end faces and said core for even heat dissipation.

18. A stator, as set forth in claim 15, wherein said coils are configured for operation with an arbitrary number of poles and an arbitrary number of phases.

* * * * *